E. P. DU PONT.
COMBINED LUBRICATION GUARD AND FEEDER.
APPLICATION FILED APR. 15, 1920.
1,368,250. Patented Feb. 15, 1921.
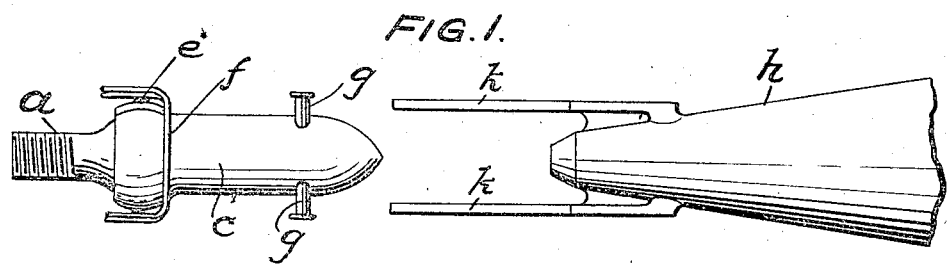
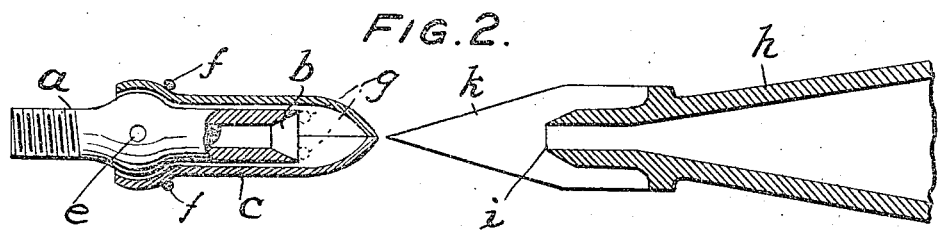
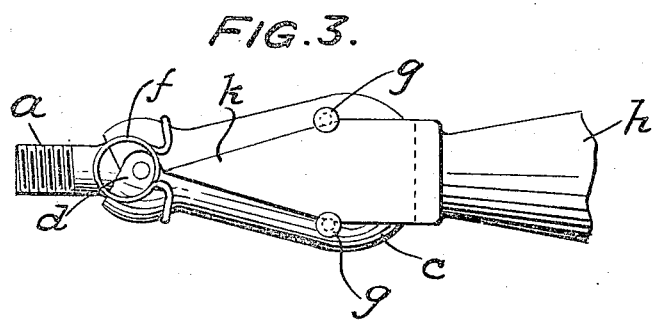
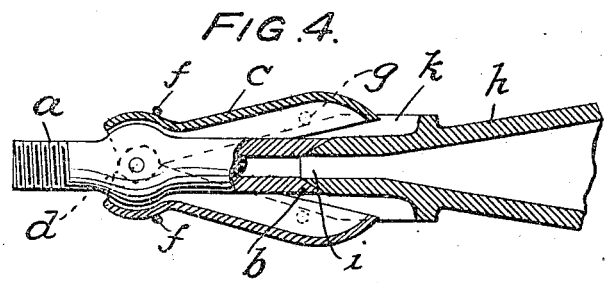
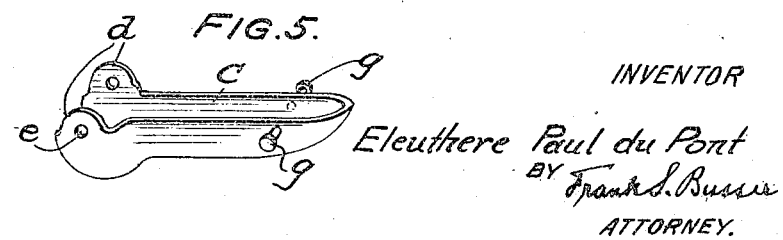
INVENTOR
Eleuthere Paul du Pont
BY Frank S. Busser
ATTORNEY.
WITNESS:
Robt R. Kitchel

UNITED STATES PATENT OFFICE.

ELEUTHERE PAUL DU PONT, OF WILMINGTON, DELAWARE.

COMBINED LUBRICATION GUARD AND FEEDER.

1,368,250.

Specification of Letters Patent. Patented Feb. 15, 1921.

Application filed April 15, 1920. Serial No. 374,009.

*To all whom it may concern:*

Be it known that I, ELEUTHERE PAUL DU PONT, a citizen of the United States, residing at Wilmington, county of New Castle, and State of Delaware, have invented a new and useful Improvement in Combined Lubrication Guards and Feeders, of which the following is a full, clear, and exact description, reference being had to the accompanying drawings, which form a part of this specification.

The object of my invention is to protect oil holes from dust, dirt and foreign substances generally and at the same time allow the introduction of oil or grease to the bearings without the necessity of wiping off the dust before oiling and without any manipulation other than that which would be required to introduce oil or grease into an unprotected oil hole. The invention is especially applicable, but not limited, to the oiling of automobile chassis parts.

A preferred embodiment of my invention is shown in the accompanying drawings, wherein—

Figure 1 is a side view of the two parts of a contrivance embodying my invention. Fig. 2 is a longitudinal sectional view on a plane at right angles to Fig. 1. Fig. 3 is a side elevation of the two parts in closed relation to each other. Fig. 4 is a similar view partly in section. Fig. 5 is a perspective view of one of the parts shown in the other figures.

The contrivance comprises two parts, namely, a nipple and an oil feeder. The nipple $a$ may be secured in permanent operative relation to the bearing, but I prefer to thread one end to allow it to be screwed into the oil hole. The opposite end is provided with a conical female opening $b$ constituting an inlet mouth for the lubricant. On opposite sides of the nipple are two wings $c$, each provided with a pair of ears $d$, the two pairs of ears being hinged, on a common axis, to the nipple. The free ends of the wings extend forward beyond the inlet mouth $b$ of the nipple. The wings are normally held in a closed position, to form a longitudinally split cover, as shown in Figs. 1 and 2, by means of a spring $f$. Projecting beyond opposite sides of each wing are pins $g$.

The oil tip or feeder comprises a spout $h$ having a male conical end or tip proper, $i$, constituting the discharge mouth of the feeder and a pair of wedges $k$ on opposite sides of the spout and extending substantially beyond the discharge mouth $i$. The spout will be integral with or connected to a can, pump or gun (not shown) containing the oil or grease to be poured or forced through the nipple.

To supply the lubricant to the oil hole, the feeder $h$ is brought into such position that its axis is about coincident with the axis of the nipple $a$ and is then pushed forward in a longitudinal direction. In this movement, the wedges $k$ enter between the pins $g$ and spread the wings $c$ apart until the conical end $i$ of the feeder centers the conical end $b$ of the nipple. The feeder and nipple are now positioned to allow the lubricant to be squirted, pumped or otherwise forced, or caused to flow, to the bearing.

The obvious advantages of this arrangement are that the oil hole is normally protected against admission of dust, dirt, etc., while the protecting cover is automatically opened by the oil feeder in the process of connecting the oil container with the oil hole. I am aware that it is known to provide an oil can nozzle with means for opening a spring closed cover of an oil cup, wherein the above functions are performed. My invention, however, secures additional advantages. It is unnecessary to wipe off the dust before oiling because no matter how much dust is on the cover none will get on the tip of the feeder and none can be carried into the nipple as the feeder mouth is brought into contact with the nipple mouth; the wedges $h$ being so far in advance of the tip of the feeder that the wings of the cover will be widely separated, and thus all parts that can collect dust will be pushed away, before the tip of the feeder has been brought into close proximity to the inlet of the nipple. In the withdrawal movement of the feeder, the tip of the feeder is well separated from the inlet of the nipple before the wings of the cover are allowed to come together. In fact, by means of my invention, one can oil a spring bolt that is covered with dust or mud to almost any extent, as readily as a clean oil hole, with no loss of time or inconvenience, it being only necessary to apply the oil can to the nipple, inject the oil and remove the can.

Another advantage of my contrivance is that, by suitable pressure of the tip against the nipple, a substantially tight joint may be formed between them, thereby adapting the contrivance not only to the use of freely flowing oil and more or less fluid grease, but also to the so-called non-fluid oil or Albany grease or any other lubricant wherein prevention of leakage between the tip and the nipple is desirable or necessary.

Having now fully described my invention, what I claim and desire to protect by Letters Patent is—

1. A lubricator connection for joining an oil hole to an oil container, comprising a nipple adapted to connect with the oil hole and having an inlet mouth, an oil feeder having a discharge mouth, and a dust cover normally inclosing said inlet mouth and adapted to be opened in the application of the oil feeder to the nipple and to close when the oil feeder is removed from the nipple, the inlet mouth of the nipple and the discharge mouth of the oil feeder being shaped to afford a substantially oil tight joint when the two are brought into feeding relation.

2. A lubricator connection for joining an oil hole to an oil container, comprising a nipple adapted to connect with the oil hole, and an oil feeder, a dust cover normally closing the nipple against admission of foreign material and adapted to be opened in the application of the oil feeder to the nipple and to close when the oil feeder is removed from the nipple, the nipple having a conical shaped inlet mouth and the feeder having engageable therewith a conical shaped discharge mouth.

3. A lubricator connection for joining an oil hole to an oil container, comprising a nipple adapted to connect with the oil hole, a spring-actuable cover normally closing the inlet, and an oil feeder adapted to be positioned with its axis in line with the axis of the nipple and adapted when moved parallel to its axis to open the cover against its spring and register with the nipple to establish a closed path of flow for the oil.

4. A lubricator connection for joining an oil hole to an oil container, comprising a screw-threaded nipple adapted to be removably secured at one end to a screw-threaded oil hole and having an inlet mouth at its other end, an oil feeder having a discharge outlet adapted to be moved into substantially oil tight relation with the inlet mouth of the nipple, and a cover for the nipple inlet mouth adapted to be opened in the movement of the feeder into feed relation with the nipple and adapted to close in the movement of withdrawal of the feeder.

5. A lubricator connection for joining an oil hole to an oil container, a nipple adapted to connect with the oil hole and having an inlet mouth, a cover for the nipple consisting of a plurality of swinging parts normally in closed relation and thus protecting the mouth of the nipple against admission of foreign material, and an oil feeder comprising a discharge mouth adapted to be moved toward a position of registering with the inlet mouth of the nipple and a pair of wedges adapted in such movement to spread the wings apart and allow the discharge mouth of the feeder to connect with the inlet mouth of the nipple.

6. A lubricator connection for joining an oil hole to an oil container, comprising a nipple adapted to connect with an oil hole and having an end opening, a pair of spring-actuated wings in hinged relation with the nipple and on opposite sides and extending beyond its end opening and normally in closed relation, projections on the wings, an oil feeder having a discharge end, and wedges on the oil feeder adapted, in the movement of the feeder toward the nipple, to engage said wings and spread them apart.

7. A lubricator connection for joining an oil hole to an oil container, comprising a nipple adapted to connect with an oil hole and having a conical end opening, a pair of spring-actuated wings in hinged relation to the nipple and on opposite sides thereof and extending beyond its end opening and normally in closed relation, projections on the wings, an oil feeder having a conical discharge end and wedges on the oil feeder extending substantially beyond its discharge end and adapted, as the feeder is moved longitudinally toward the nipple, to engage said wings and spread them apart as the conical end of the feeder approaches the conical end of the nipple.

8. A lubricator connection for joining an oil hole to an oil container comprising a nipple, a feed tube movable toward the nipple, a longitudinally split cover extending beyond the inlet end of the nipple and normally closing the same, and a cover opener projecting substantially beyond the front of the feed tube and adapted, as the feed tube is moved toward the nipple longitudinally of both the feed tube and nipple, to spread apart the parts of the cover before the feed tube is engaged with the nipple.

In testimony of which invention, I have hereunto set my hand, at Wilmington, Del., on this 13th day of April, 1920.

ELEUTHERE PAUL DU PONT.